United States Patent [19]

McGee

[11] 4,147,325
[45] Apr. 3, 1979

[54] HYDRAULIC CONTROL ASSEMBLY
[75] Inventor: John K. McGee, Houston, Tex.
[73] Assignee: Combustion Engineering, Inc., Windsor, Conn.
[21] Appl. No.: 782,508
[22] Filed: Mar. 29, 1977
[51] Int. Cl.² .................. F16K 31/143; F15B 13/042
[52] U.S. Cl. ..................................... 251/25; 251/62; 91/437; 91/438
[58] Field of Search .................. 251/62, 63.5, 25; 91/436, 437, 438, 439

[56] References Cited
U.S. PATENT DOCUMENTS

| | | | |
|---|---|---|---|
| 2,367,682 | 1/1945 | Kehle | 91/436 |
| 2,922,401 | 1/1960 | Hromas et al. | 91/440 X |
| 3,244,399 | 5/1966 | Jones et al. | 251/62 X |
| 3,495,501 | 2/1970 | Kure-Jensen | 91/440 |
| 3,656,708 | 4/1972 | Hobbs | 251/63.6 |
| 3,757,646 | 9/1973 | Rohner | 91/437 X |
| 3,933,338 | 1/1976 | Herd et al. | 251/63.6 |

Primary Examiner—Arnold Rosenthal
Attorney, Agent, or Firm—Cushman, Darby & Cushman

[57] ABSTRACT

A hydraulic control assembly especially suited for operation of a fail-safe valve. An integral structure is provided having a pair of check valves disposed in passageways extending from one chamber of a piston operator to a hydraulic reservoir and the other chamber of the piston reservoir, and in a fluid line extending from a high pressure source. In a fail-safe valve, cavity pressure normally acts on the valve stem and provides the force which moves the valve to its close position. A spring is disposed in the second chamber of the piston operator and, in conjunction with any force resulting from internal cavity pressure on the valve stem, aids in closing the valve. The second chamber is equal or greater in volume than the first chamber so that all of the hydraulic fluid displaced from the first chamber during valve closing can flow into the second chamber. In this way, the hydraulic power needed to pump hydraulic fluid back to the reservoir is not effected by installed hydraulic system variations. Additionally, these results are achieved while containing the fluid in a closed system. Fail-safe valves can be designed to either fail to the open or fail to the closed position.

10 Claims, 6 Drawing Figures

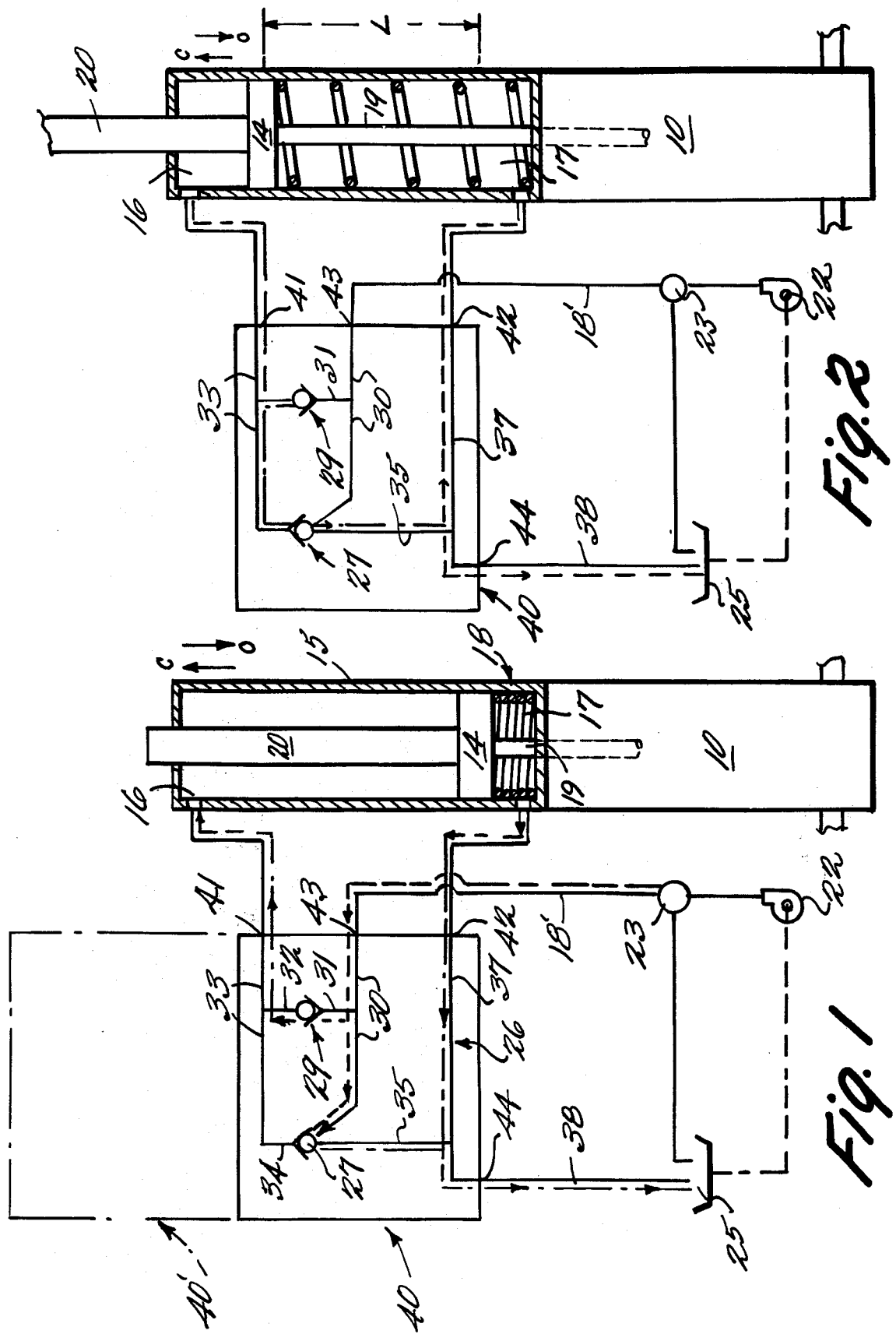

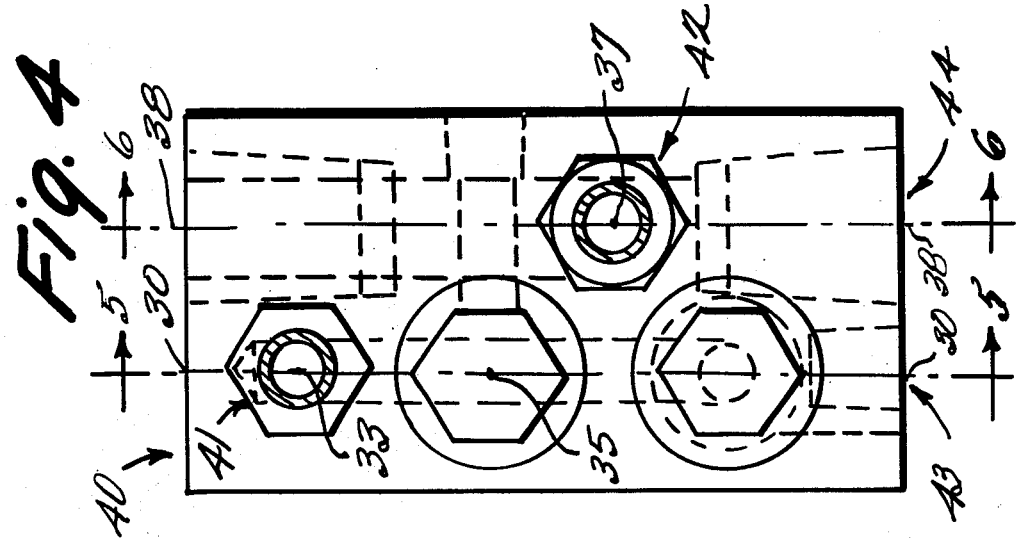
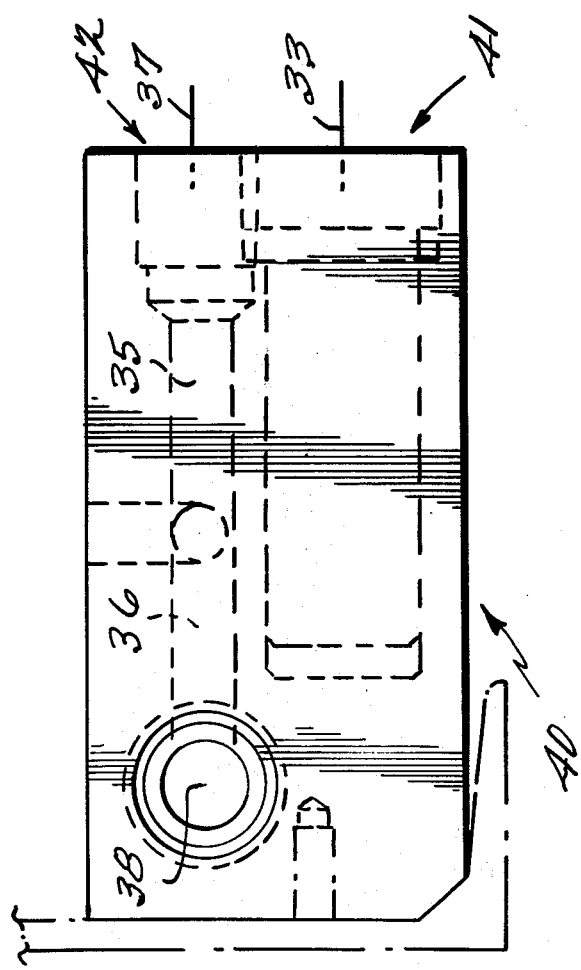

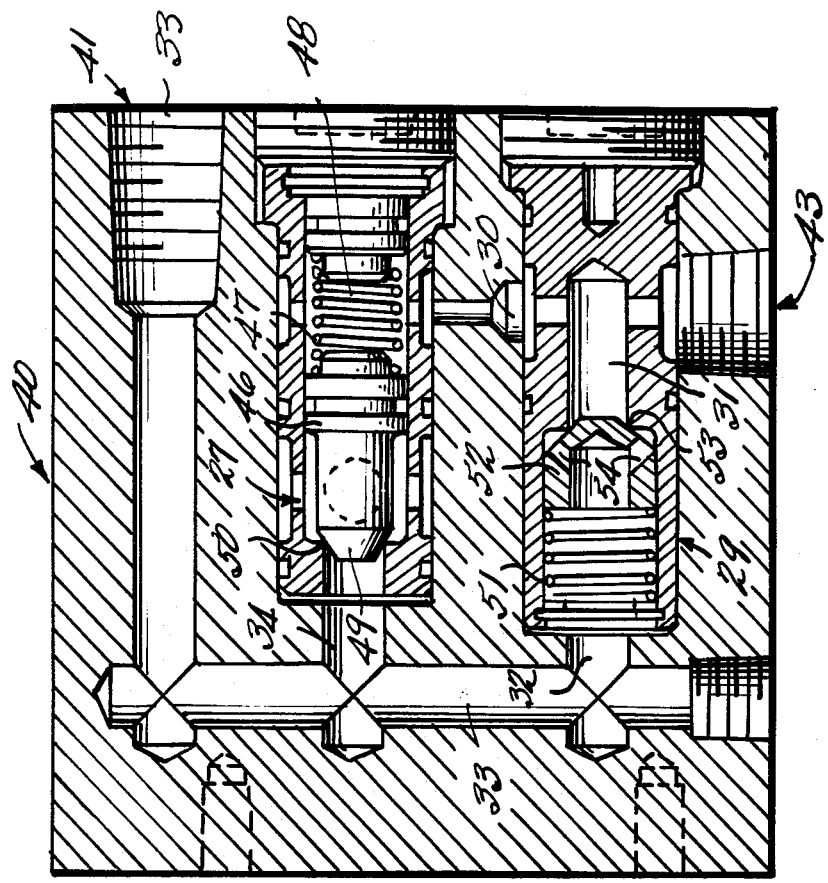
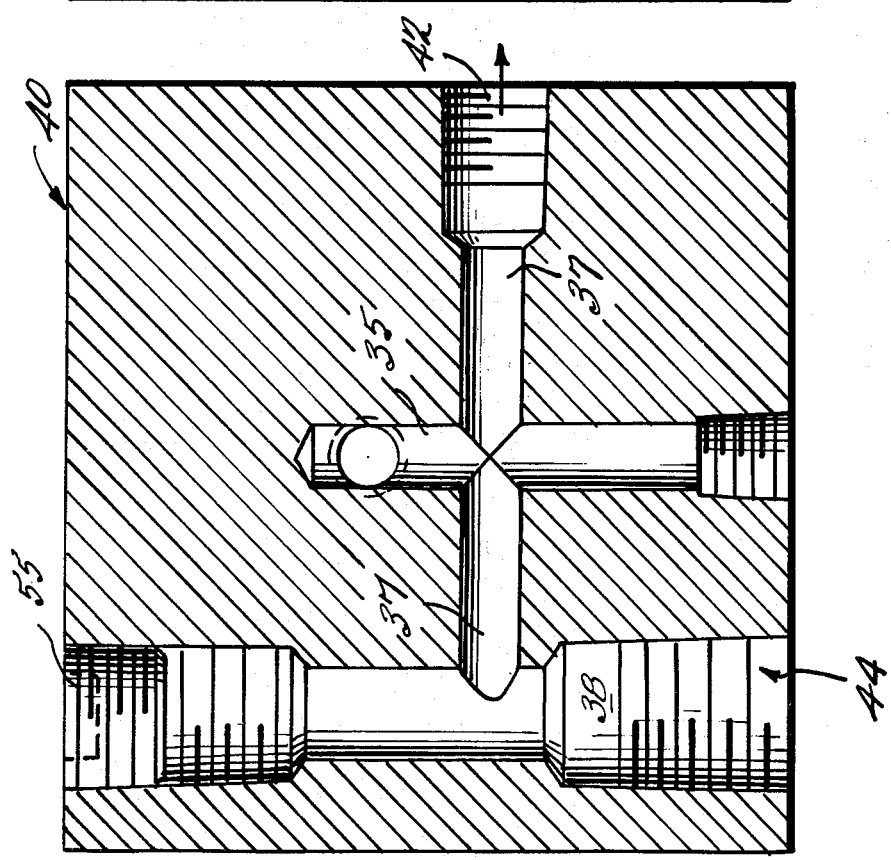

4,147,325

HYDRAULIC CONTROL ASSEMBLY

BACKGROUND AND SUMMARY OF THE INVENTION

Fluidic operators are normally provided for the operation of fail-safe valves in well head assemblies. Since it is necessary to quickly close such valves upon command or when a particular well head condition is sensed, generally pneumatic operators are provided for the valves, the air in the operator cylinder being exhausted directly into the atmosphere upon closing of the fail-safe valve. This exahaustion of air into the atmosphere provides a rapid closing time due to a minimum back pressure and not having to recycle the air. Under many circumstances, however, hydraulic actuators are more desirable than pneumatic actuators. Additionally, it is sometimes desirable to effect actuation of the operators with a gaseous fluid that is noxious (i.e., $H_2S$), and should not be vented to atmosphere. Under such circumstances, upon closing of the fail-safe valve, the fluid must be returned to the fluid reservoir.

In the case of the use of hydraulic fluid for actuation, the necessity for recycle of the hydraulic fluid results in longer closing time or larger lines or both, often times making hydraulic actuation infeasible. There have been proposals for the rapid closing of valves with hydraulic actuators, such as shown in U.S. Pat. No. 3,495,501, however such proposals do not necessarily result in the desired closing quickness, and often require a large number of complicated arrangements including two sources of high pressure hydraulic fluid, a check valve and three other valves, each valve being a three-way or more valve, etc.

According to the present invention, an actuator is provided, especially suited for rapid closing of a fail-safe valve, which is relatively simple yet provides for rapid valve closing and recycle of the actuating fluid. [While the invention will be described with particular reference to hydraulic fluid, it is to be noted that other fluids besides hydraulic fluids may be utilized, and the invention is not to be limited to hydraulic fluids.] According to the present invention, a piston actuator is provided disposed in the cylinder and dividing the cylinder into first and second chambers, the piston movable in a first direction to shrink the first chamber and effect rapid valve closing, and movable in a second direction to shrink the second chamber for opening with the valve. Biasing means are disposed in the second chamber for biasing the piston operator for rapid closing, and the first and second chambers are constructed so that the maximum displaceable volume of the first cylinder chamber is equal to or less than the maximum displaceable volume of the second cylinder chamber. During closing of the valve, the fluid displaced from the first piston chamber is vented to the second piston chamber rather than being pumped back the distance to the hydraulic reservoir, so that the minimum resistance to piston movement is provided. During the application of high pressure hydraulic fluid to the first chamber to open the valve, the fluid in the second chamber is then ultimately pumped back to the reservoir.

An integral valve assembly is provided for valving fluid to the first and second chambers from and to a high pressure source of hydraulic fluid and a hydraulic reservoir. The integral valve assembly includes a first passageway in the block leading from a first opening to the exterior of the block to a second opening to the exterior, a first check valve disposed in the first passageway for allowing passage of fluid from the first opening to the second opening but not vice-versa, a second passageway in the block leading from a third opening to the exterior of the block to the first check valve operator to bias the operator closed to prevent passage of fluid through the first passageway past the check valve in either direction, a third passageway in the block leading from the third opening to the second opening, a second check valve disposed in the third passageway for allowing passage of fluid from the third opening to the second opening but not vice-versa, and a fourth passageway in the block leading from the second opening to a fourth opening to the exterior of the block. A plurality of valve assemblies may be stacked one upon the other for providing operation of a plurality of fail-safe valves, common fluid supply and fluid drain lines being provided for the assemblies. According to the invention, only two simple check valves need be provided for effecting the valving operations for rapid closing of a fail-safe valve and for opening thereof.

It is the primary object of the present invention to provide hydraulic operator means capable of rapid movement in one direction, utilizing a minimum number of simple components. This and other objects of the invention will become clear from an inspection of the detailed description of the invention and from the appended claims.

BRIEF DESCRIPTION OF THE DRAWINGS

FIG. 1 is a schematic view of an exemplary assembly according to the present invention with the piston operator in valve open position;

FIG. 2 is a schematic similar to that of FIG. 1 but showing the piston operator in valve closed position;

FIG. 3 is a side view of the integral valve assembly of FIG. 1;

FIG. 4 is another side view of the valve assembly of FIG. 1;

FIG. 5 is a cross-sectional view taken along lines 5—5 of FIG. 4; and

FIG. 6 is a cross-sectional view taken along lines 6—6 of FIG. 4.

DETAILED DESCRIPTION OF THE INVENTION

The invention relates to a fail-safe valve operator assembly, including the particular piston and cylinder assembly therefor and the integral valve assembly therefor. A conventional well head fail-safe valve is shown schematically at 10 in FIGS. 1 and 2. A piston and cylinder assembly 12 is provided as means for opening and closing the fail-safe valve 10, the piston and cylinder assembly comprising a piston 14 disposed in a cylinder 15 and separating the cylinder into a first chamber 16 and a second chamber 17. The first chamber 16 shrinks upon movement of the piston 14 in a first direction C, and the second chamber 17 shrinks upon movement of the piston 14 in a second direction O. Means are provided for moving the piston 14 in the first and second directions C, O, such means comprising means 18 for biasing the piston in the first direction C for rapid movement of the piston 14 in direction C, and hydraulic means 18'. The hydraulic means 18' includes means defining the piston cylinder 15 so that the maximum displaceable volume of the first cylinder chamber 16, which is exhausted during movement of the piston in direction C to effect valve closing, is equal to or less than the volume of the second cylinder chamber 17, which is exhausted during movement of the piston in the second direction O to effect valve opening. This may be accomplished as shown in FIGS. 1 and 2 by providing interior means 18, 19 and 20, the interior means 20 in the first chamber 16 operatively associated with piston 14 having a volume greater than or equal to the volume of the interior means 18, 19 in the second chamber 17 operatively associated with piston 14. The biasing means 18 preferably comprises a coil spring that is disposed within the second chamber 17, and interior means 19 and 20 comprise a pair of piston rods. As an inspection of FIGS. 1 and 2 makes clear, the piston rod 20 in the first chamber 16 has a cross-sectional area, and therefore a volume per unit length, greater than that of the piston rod 19 which is connected to the valve 10, the volume of the rod 20 in an intermediate position of the piston 14 exactly between valve opening and valve closing positions being greater than or equal to the combined volumes of the coil spring 18 and the piston rod 19 within chamber 17. By constructing the cylinder 15 in this manner, the entire contents of the first chamber 16 may be vented to the second chamber 17 upon movement of the piston 14 in direction C.

The hydraulic means 18' also comprises a high pressure source of hydraulic fluid 22 such as a hydraulic pump, a hydraulic fluid reservoir 25, and means 26 for valving the hydraulic fluid to effect movement of the piston in direction C upon termination of the flow of hydraulic fluid from the high pressure source 22, without leakage of hydraulic fluid from the assembly, and to effect movement of the piston in the second direction O responsive to the high pressure fluid from source 22. A master control valve 23 may be provided, which valve can be manually operated and/or condition-responsive to either allow the passage of fluid from high pressure source 22 to the first chamber 16, or for venting the high pressure fluid back to the reservoir 25. The valve 23, source 22 and reservoir 25 may be located remote from the cylinder 15, however it is preferred that the valving means 26 be located adjacent the cylinder 15.

Valving of the hydraulic fluid to effect piston 14 movement is provided by the valving means 26 associated with a plurality of passageways interconnecting the valves and the chambers 16, 17 with the source 22 and reservoir 25. A number of fluid lines are provided including a fluid line 30 which leads from source 22 to a first check valve 27 to bias the check valve 27 closed when fluid is supplied through line 30. A branch 31 off of line 30 is provided leading to a second check valve 29 and from second check valve 29 a line 32 extends to a line 33 which ultimately passes to the first chamber 16. The second check valve 29 allows fluid flow from line 31 to line 32 (when high pressure fluid is provided by source 22) but does not allow the passage of fluid from line 32 to line 31 (when fluid under pressure is no longer supplied by source 22). During operation of the assembly to effect opening of the fail-safe valve 10, the source 22 supplies fluid under pressure through line 30 to bias first check valve 27 closed, the fluid then flowing through line 31—past second check valve 29—through line 32, and ultimately to line 33 to first chamber 16 to move the piston 14 in direction O.

A branch line 34 is provided off of line 33, the first check valve 27 being provided in branch 34, and a line 35 extending from the first check valve 27. The first check valve 27 allows the flow of fluid from line 34 to line 35, but does not allow the flow of fluid from line 35 to line 34. When high pressure fluid is supplied to line 30, however, the check valve 27 does not allow the passage of fluid from line 34 to 35 in either direction. The line 35 passes to a line 37 which at one end extends to the second cylinder chamber 17, and at the other end connects up to a drain line 38 which extends to the hydraulic reservoir 25. When fluid is supplied by source 22 through line 30, the fluid vented from the second chamber 17 passes through line 37 to line 38, and ultimately to the reservoir 25, the power from the pressurized hydraulic fluid being supplied to first chamber 16 providing the force for pumping the fluid from second chamber 17 back to the reservoir 25.

Preferably, the valving means 26 and associated lines are provided as an integral valve assembly 40, which assembly is shown schematically in FIGS. 1 and 2 and shown in more detail in FIGS. 3 through 6. Such an assembly 40 comprises a block of any suitable material having a first opening 41, a second opening 42, a third opening 43, and a fourth opening 44 therein extending to the exterior of the block. The lines 30 through 35, 37 and 38 may be considered to define four passageways in the block, a first passageway being defined by lines 33, 34, 35, and 37 connecting first opening 41 to second opening 42, the first check valve 27 being disposed in the first passageway for allowing passage of fluid from the first opening 41 to the second opening 42 but not vice versa. The first check valve 27—as shown most clearly in FIG. 5—includes a valve operator 46 which comprises a piston which is spring biased by coil spring 47 or the like to a closed position, a fluid receiving chamber 48—connected to line 30—being provided. When fluid under pressure is passed into chamber 48, it works with the spring force of spring 47 to hold the piston operator 46 in the closed position so that conical head 49 of operator 46 seals against a passageway peripheral seal 50 for the line 34. Once fluid under pressure is removed from the chamber 48, the operator 46 is free to move against the bias of spring 47 to allow the passage of fluid between head 49 and passageway periphery 50 into line 35.

The second passageway disposed in the block is defined by the line 30, extending from the third opening 43 to the first check valve 27 operator 46 to bias the operator closed and prevent passage of fluid through the first passageway through the check valve 27 in either direction. The third passageway formed in the block is defined by portions of lines 30, 31, 32 and 33, the third passageway leading from the third opening 43 to the first opening 41, the second check valve 29 being disposed in the third passageway for allowing passage of fluid from the third opening 43 to the first opening 41 but not vice versa. The second check valve 29, which is shown most clearly in FIG. 5, comprises a conventional check valve having a spring 51 biasing a sealing head portion 52 thereof into sealing engagement with the periphery 53 of line 31, a plurality of openings 54 being provided in the head 52 to allow the flow of fluid from line 31 to line 32 upon movement of the head 52 against the bias of spring 51 in response to fluid pressure in line 31. The fourth passageway formed in the block is defined by lines 37 and 38, the fourth passageway leading from the second opening 42 to the fourth opening 44.

When it is desired to provide for operation of a plurality of piston and cylinder operators 12 for a plurality of valves 10, a plurality of blocks (see 40' in FIG. 1) may be provided which are substantially identical to the integral valve assembly 40. The drain line 38 of all of the assemblies 40 is common, the connection therebetween being provided merely by removing plug 55 (see FIG. 6) in drain line 38 of valve assembly 40 and connecting it up to the corresponding line 38 in another valve assembly (40'). The openings 43 of each valve assembly (40, 40') are commonly connected to a single source 22, and a separate condition-responsive valve may be disposed adjacent each opening 43 to provide selective valving by each of the assemblies 40, 40' to operate their respective piston and cylinder arrangements 12.

It will be noted that the assemblies 40, 40' are normally located directly adjacent piston and cylinder arrangements 12, while the hydraulic reservoir 25 and source 22 are located remote from the assemblies 12 at a convenient central location. The first passageway, defined by lines 33, 34, 35 and 37, which leads from the first chamber 16 to the second chamber 17 thus has a relatively short length, and has less fluid resistance than the passageway leading from chamber 16 to hydraulic reservoir 25. This, combined with the relative volumes of the chambers 16, 17, means that upon movement of piston 14 in direction C under the influence of spring 18, fluid in chamber 16 will normally flow (see FIG. 2) to the second chamber 17, although flow to line 38 and reservoir 25 is allowed. Thus, the power needed to exhaust the fluid from chamber 16 is much less reduced than were it necessary to pump all of the fluid back to reservoir 25, and therefore the spring 18 can be made smaller, or faster operation of the valve 10 can be provided. The spent fluid is not pumped back to the reservoir 25 until fluid under pressure is again supplied by source 22 through line 30 to move piston 14 in direction O, whereby the fluid from chamber 17 passes through line 37 to line 38 and ultimately to reservoir 25.

The structure according to the present invention having been described, an exemplary method of operation thereof will now be set forth:

The fail-safe valve 10 is maintained in open condition by supplying fluid from high pressure source 22 through valve 23 to line 30, the high pressure fluid in line 30 passing into chamber 48 and biasing the piston operator 46 of first check valve 27 closed so that no fluid can pass from line 34 to line 35, the fluid from line 30 also passing through line 31, through second check valve 29, through lines 32 and 33 into first cylinder chamber 16 to slowly move the piston in direction O, effecting opening of the valve 10. The power supplied by the fluid under pressure pumps the fluid out of second chamber 17 into line 37 to drain line 38, and ultimately to reservoir 25. Movement of the piston 14 in direction O is shown schematically in FIG. 1; the valve 10 will remain open as long as the line 30 is pressurized.

Should it be desired to close fail-safe valve 10, it will be necessary that rapid closing be effected. This is accomplished by releasing the high pressure from line 30, as by operation of valve 23 to vent the hydraulic fluid to reservoir 25 (the operation of valve 23 being effected manually and/or in response to a condition sensed in the well head assembly). When this takes place, as shown in FIG. 2, fluid is no longer prevented from flowing through first check valve 27 from line 34 to line 35, and the spring 18 is no longer compressed, the spring 18 rapidly moving the piston 14 in direction C. The fluid from first chamber 16 passes through line 33, 34, 35, and 37 to the second chamber 17, the first and second chambers 16, 17 being located relatively close together so that a minimum amount of force need be applied by the spring 18 to effect such pumping, a flow passageway also being provided through line 38 to reservoir 25. No fluid can flow through second check valve 29 since the check valve 29 will be biased closed. Since the maximum displaceable volume of chamber 16 is less than or equal to the maximum displaceable volume of chamber 17, essentially all of the fluid from chamber 16 may be pumped to chamber 17, and rapid closing of the valve 10 while retaining the hydraulic fluid in a closed system is thus effected.

It will be seen that according to the present invention an assembly has been provided that allows rapid closing of a fail-safe valve with hydraulic fluid, yet provides a minimum number of component parts and retains all of the hydraulic fluid within the system. Many of the complicated components of prior art proposals, such as shown in U.S. Pat. No. 3,495,501, are eliminated without consequent loss of their function. While the invention has been herein shown and described in what is presently conceived to be the most practical and preferred embodiment thereof, it will be apparent to one of ordinary skill in the art that many modifications thereof are possible. For instance, the piston and cylinder arrangement 12, and the valve assembly 40 need not necessarily be provided for operation of a fail-safe valve 10, but may be provided for operation of other structures. Thus, the disclosure of the invention is to be considered only as exemplary, and the invention is to be limited only be the appended claims which are to be interpreted broadly so as to encompass all equivalent structures and assemblies.

What is claimed is:

1. A fail-safe valve operator assembly comprising
(a) a fail-safe valve,
(b) means for opening and closing said fail safe valve, comprising a piston movable in a cylinder and dividing the cylinder into first and second chambers, said piston operatively connected to said valve, said piston when moved in a first direction closing said valve, and when moved in a second direction opening said valve, said first chamber having a maximum displaceable volume which is exhausted during movement of said piston in said first direction to effect valve closing, and said second chamber having a maximum displaceable volume which is exhausted during movement of said piston in said second direction to effect valve opening,
(c) means for moving said piston in said first and second directions, said means comprising (i) means for biasing said piston in said first direction for rapid movement in said first direction comprising a coil spring disposed in said second chamber abutting said piston, and (ii) fluid means, and
(d) said fluid means comprising (i) means defining said piston cylinder so that the maximum displaceable volume of the first cylinder chamber, which is exhausted during movement of said piston in said first direction to effect valve closing, is equal to or less than the maximum displaceable volume of the second cylinder chamber which is exhausted during movement of said piston in said second direction to effect valve opening, (ii) a high-pressure source of fluid for supplying fluid to said cylinder to move said piston in said second direction, (iii) a fluid reservoir, and (iv) means for valving said fluid to effect movement of said piston in said first direction upon termination of the flow of fluid from said high-pressure source without leakage of fluid from the assembly, and to effect movement of said piston in said second direction responsive to said high-pressure fluid source.

2. An assembly as recited in claim 1 wherein said fluid means further comprises means defining a first passageway and a passageway leading from said first cylinder chamber to said reservoir, said first passageway extending from said first cylinder chamber to said second cylinder chamber, said passageway having a shorter length and less fluid resistance than said passageway leading from said first cylinder chamber to said reservoir.

3. An assembly as recited in claim 2 wherein said means for valving said fluid comprises an integral unit including said first passageway, said first passageway having a first check valve disposed therein for allowing passage of fluid therethrough from said first chamber to said second chamber but preventing passage of fluid, from said second chamber to said first chamber, said check valve having a check valve operator and a second passageway leading from said high-pressure source for supplying fluid to said first check valve operator to bias said operator closed to prevent passage of fluid from said first chamber to said second chamber when fluid under pressure is being provided by said source of fluid under pressure.

4. An assembly as recited in claim 3 wherein said integral unit further comprises a third passageway leading from said high-pressure fluid source to said first chamber and a second check valve disposed in said third passageway for preventing passage of fluid in said third passageway from said first chamber to said second chamber while allowing passage of fluid in said third passageway from said high-pressure source to said first chamber.

5. An assembly as recited in claim 4 further comprising a fourth passageway leading from said second chamber to said fluid reservoir.

6. An assembly as recited in claim 1 wherein said means defining said piston cylinder so that the volume of said first chamber is equal to or less than the volume of said second chamber comprises a first piston rod disposed in said first chamber, and a second piston rod disposed in said second chamber and operatively connected to said fail-safe valve, said first piston rod having a larger or equal volume for a given length of said first chamber than the volume of said second piston rod for the same given length plus the volume of said coil spring in said second chamber.

7. In a fail-safe valve operator assembly comprising
(a) a fail-safe valve;
(b) means for opening and closing said fail-safe valve, comprising a piston movable in a cylinder and dividing the cylinder into first and second chambers, said piston operatively connected to said valve, said piston when moved in a first direction closing said valve, and when moved in a second direction opening said valve, said first chamber having a maximum displaceable volume which is exhausted during movement of said piston in said first direction to effect valve closing, and said second chamber having a maximum displaceable volume which is exhausted during movement of said piston in said second direction to effect valve opening;
(c) means for moving said piston in said first and second directions, said means including (i) means for biasing said piston in said first direction for rapid movement in said first direction, and (ii) fluid means;
(d) said fluid means comprising (i) means defining said piston cylinder so that the maximum displaceable volume of the first cylinder chamber is equal to or less than the maximum displaceable volume of the second cylinder chamber, (ii) a high pressure source of fluid for supplying fluid to said cylinder to move said piston in said second direction, (iii) a fluid reservoir, and (iv) means for valving said fluid to effect movement of said piston in said first direction upon termination of the flow of fluid from said high-pressure source without leakage of fluid from the assembly, and to effect movement of said piston in said second direction responsive to said high-pressure fluid source; and wherein
(e) said means defining said piston cylinder so that the volume of said first chamber is equal to or less than the volume of said second chamber comprises a first piston rod disposed in said first chamber, and a second piston rod disposed in said second chamber and operatively connected to said fail-safe valve, said first piston rod having a larger or equal volume for a given length of said first chamber than the volume of said second piston rod for the same given length plus the volume of any other interior structures in said second chamber.

8. In a fail-safe valve operator assembly comprising
(a) a fail-safe valve;
(b) means for opening and closing said fail-safe valve, comprising a piston movable in a cylinder and dividing the cylinder into first and second chambers, said piston operatively connected to said valve, said piston when moved in a first direction closing said valve, and when moved in a second direction opening said valve, said first chamber having a maximum displaceable volume which is exhausted during movement of said piston in said first direction to effect valve closing, and said second chamber having a maximum displaceable volume which is exhausted during movement of said piston in said second direction to effect valve opening;
(c) means for moving said piston in said first and second directions, said means including (i) means for biasing said piston in said first direction for rapid movement in said first direction, and (ii) fluid means;
(d) said fluid means comprising (i) means defining said piston cylinder so that the maximum displaceable volume of the first cylinder chamber is equal to or less than the maximum displaceable volume of the second cylinder chamber, (ii) a high pressure source of fluid for supplying fluid to said cylinder to move said piston in said second direction, (iii) a fluid reservoir, and (iv) means for valving said fluid to effect movement of said piston in said first direction upon termination of the flow of fluid from said high-pressure source without leakage of fluid from the assembly, and to effect movement of said piston in said second direction responsive to said high-pressure fluid source; and wherein
(e) said fluid means further comprises an integral unit including a first passageway extending from said first cylinder chamber to said second cylinder chamber, said first passageway having a first check valve disposed therein for allowing passage of fluid therethrough from said first chamber to said second chamber by preventing passage of fluid from said second chamber to said first chamber, said check valve having a check valve operator and a second passageway leading from said high-pressure source for supplying fluid to said first check valve operator to bias that operator closed to prevent passage of fluid from first said chamber to said second chamber while fluid under pressure is being provided by said source of fluid under pressure, and a third passageway leading from said high pressure fluid source to said first chamber in a second check valve disposed on said third passageway for preventing passage of fluid in said third passageway from said high-pressure source to said first chamber.

9. In an assembly as recited in claim 8 further comprising a fourth passageway leading from said second chamber to said fluid reservoir.

10. In an assembly as recited in claim 8 wherein said biasing means comprises spring means disposed in said maximum displaceable portion of said second chamber and in operative engagement with said piston.

* * * * *